United States Patent
Davies et al.

(10) Patent No.: US 11,891,562 B2
(45) Date of Patent: Feb. 6, 2024

(54) DRILLING FLUID COMPRISING A LUBRICANT

(71) Applicant: EQUUS UK TOPCO LTD, East Yorkshire (GB)

(72) Inventors: Craig Allan Davies, East Yorkshire (GB); Kevin John Duncan, East Yorkshire (GB); Helen Rachel Sarginson, East Yorkshire (GB)

(73) Assignee: EQUUS UK TOPCO LTD, East Yorkshire (GB)

( * ) Notice: Subject to any disclaimer, the term of this patent is extended or adjusted under 35 U.S.C. 154(b) by 144 days.

(21) Appl. No.: 16/978,468

(22) PCT Filed: Mar. 5, 2019

(86) PCT No.: PCT/EP2019/055372
§ 371 (c)(1),
(2) Date: Sep. 4, 2020

(87) PCT Pub. No.: WO2019/170627
PCT Pub. Date: Sep. 12, 2019

(65) Prior Publication Data
US 2021/0095178 A1  Apr. 1, 2021

(30) Foreign Application Priority Data
Mar. 7, 2018 (GB) .................. 1803610

(51) Int. Cl.
*C09K 8/06* (2006.01)
*C09K 8/28* (2006.01)
*E21B 21/00* (2006.01)

(52) U.S. Cl.
CPC ............... *C09K 8/06* (2013.01); *C09K 8/28* (2013.01); *E21B 21/00* (2013.01); *C09K 2208/34* (2013.01)

(58) Field of Classification Search
CPC ............ C09K 2208/12; C09K 2208/22; C09K 2208/34; C09K 8/03; C09K 8/06; C09K 8/28; C09K 8/50; E21B 21/00
See application file for complete search history.

(56) References Cited

U.S. PATENT DOCUMENTS

| 2,950,299 A | 8/1960 | Kirkpatrick |
| 4,776,966 A | 10/1988 | Baker |
| 2017/0114287 A1 | 4/2017 | Rouse et al. |
| 2017/0342341 A1 | 11/2017 | Maker et al. |
| 2019/0078009 A1* | 3/2019 | Mettath ............... C10M 145/38 |

FOREIGN PATENT DOCUMENTS

| GB | 2283036 A | 4/1995 |
| WO | WO 2005/087891 A1 | 9/2005 |
| WO | WO 2017/079123 A1 | 5/2017 |

OTHER PUBLICATIONS

Swartwout, R. & Pearcy, R., "Design and Application of Brine-Based Drilling Fluids", SPE 35332, 1996, pp. 255-261 (Year: 1996).*
"The Use of A Star Polymer As A Rheology Modifier In Drilling Muds"; Research Disclosure; No. 642139; Croda, Inc.; Oct. 2017; 3 pages.
International Patent Application No. PCT/EP2019/055372; Int'l Written Opinion and Search Report; dated May 22, 2019; 10 pages.

* cited by examiner

*Primary Examiner* — Frances Tischler

(57) ABSTRACT

The present invention provides a drilling fluid comprising a compound c) which comprises a dimer and/or trimer fatty acid residue and an alkyleneoxy chain comprising a first ethyleneoxy section, a second ethyleneoxy section and a propyleneoxy section located between said first and second ethyleneoxy sections, wherein the propyleneoxy section comprises from 1 to 20 propyleneoxy groups. Use of such a drilling fluid to lubricate a drill bit, and a method of drilling a well bore comprising circulating such a drilling fluid, are also provided.

18 Claims, No Drawings

DRILLING FLUID COMPRISING A LUBRICANT

CROSS-REFERENCE TO RELATED APPLICATIONS

This application is the National Stage of International Patent Application No. PCT/EP2019/055372, filed Mar. 5, 2019, which claims priority from Great Britain Patent Application No. 1803610.3, filed Mar. 7, 2018, the disclosures of each of which are incorporated herein by reference in their entireties for any and all purposes.

FIELD OF INVENTION

The present invention relates to drilling fluids, to uses of compounds as drilling lubricants in such drilling fluids and to methods of drilling wells using such drilling fluids (e.g. in a geological formation), particularly water, oil and/or gas wells.

BACKGROUND

Drilling holes or wells in the ground (e.g. in a geological formation) is often undertaken to access natural resources such as water or hydrocarbons e.g. oil and/or gas. In such drilling it is usual to provide a drilling fluid (sometimes called a drilling mud) circulating through the wellbore being drilled e.g. within the drill string, around the drill bit and returning to the surface. The drilling fluid or mud is specially designed and formulated to facilitate the drilling operation. The various functions of a drilling fluid include removing drill cuttings from the wellbore, cooling and lubricating the drill bit, aiding in support of the drill pipe and drill bit, and providing a hydrostatic head to maintain the integrity of the wellbore walls and prevent well blowouts.

An important function of the drilling fluid is to cool and lubricate the bit and to carry drilling cuttings away from the bit. The hydrostatic pressure exerted by the drilling fluid is often also used to balance pressure within the geological (e.g. rock) formation through which the hole is being drilled, most notably when a pressurised fluid e.g. water, oil or gas, is contained within the rock.

Drilling fluids comprise a carrier fluid and typically a particulate solid (often referred to as a weighting agent) and one or more chemical additives. Drilling fluids are commonly divided into two categories, water based fluids or muds (IV-BM) and oil based fluids or muds (OBM). In the former the majority of the carrier fluid is an aqueous medium and in the latter the majority is oil. Emulsions such as inverse (water-in-oil) emulsions may also be used in drilling fluids. Inverse (or invert) emulsion muds (containing up to 50 wt % aqueous component in the internal phase) are often classified as oil based muds.

While WBM are generally more environmentally acceptable than OBM (since the latter still give rise to the problem of disposing of large quantities of oil contaminated drill cuttings, even if the oil is of low toxicity), they are sometimes considered inferior in one or more aspects such as thermal stability and/or lubricity.

A brine of one or more dissolved salts or ions in water, is often included in the drilling fluid. Drilling lubricant additives are also commonly included to improve the lubrication properties of the drilling fluid, particularly to improve lubrication of or around the drill bit.

Incompatibility between the drilling lubricant and the type of brine used can be a disadvantage in a drilling fluid, and can arise with concentrated brines, particularly saturated or near saturated brines or with the presence of materials such as calcium, particularly as calcium chloride; formate salts; and soluble silicate salts which can be used in very highly alkaline brines.

It is an object of the present invention to address at least one of the above or other disadvantages associated with the prior art.

SUMMARY OF THE INVENTION

The present invention is based in part on the recognition that a compound comprising a dimer and/or trimer fatty residue and an alkyleneoxy chain comprising a first ethyleneoxy section, a second ethyleneoxy section, and a propyleneoxy section located between the first ethyleneoxy section and the second ethyleneoxy section, wherein the propyleneoxy section comprises from 1 to 20 propyleneoxy groups may provide one or more advantages when used in a drilling fluid. The compound may be used, for example, as a drilling fluid lubricant. The advantage(s) may include a reduction in friction in one or more parts of a drilling system (e.g. at a drilling bit) and/or compatibility with one or more drilling fluid brines.

Thus, viewed from a first aspect, the present invention provides a drilling fluid comprising:
a) an aqueous brine phase;
b) a particulate solid phase;
c) a compound comprising a dimer and/or trimer fatty residue and an alkyleneoxy chain comprising a first ethyleneoxy section, a second ethyleneoxy section, and a propyleneoxy section located between the first ethyleneoxy section and the second ethyleneoxy section, wherein the propyleneoxy section comprises from 1 to 20 propyleneoxy groups; and
d) optionally, one or more additives selected from rheology modifiers, fluid loss control agents, shale inhibitors, gas hydrate inhibitors and dispersants;
wherein the drilling fluid is suitable for lubricating a drill bit during drilling in a geological formation.

Viewed from a second aspect, the present invention provides a method of drilling a well bore comprising the steps of circulating a drilling fluid through a drill string extending through the well bore and around a drill bit, wherein the drilling fluid is a drilling fluid according to the first aspect.

Viewed from a third aspect, the present invention provides the use in a drilling fluid of a compound to lubricate a drill bit wherein the compound comprises a dimer and/or timer fatty residue and an alkyleneoxy chain comprising a first ethyleneoxy section, a second ethyleneoxy section, and a propyleneoxy section located between the first ethyleneoxy section and the second ethyleneoxy section, wherein the propyleneoxy section comprises from 1 to 20 propyleneoxy groups.

Any aspect of the invention may include any of the features described herein, regardless of whether that feature is described with regard to that aspect of the invention or otherwise (e.g. the feature may be referred to in another aspect of the invention, the background or the examples).

DETAILED DESCRIPTION OF THE INVENTION

It will be understood that any upper or lower quantity or range limit used herein may be independently combined.

It will be understood that, when describing the number of carbon atoms in a substituent group (e.g. 'C1 to C6'), the number refers to the total number of carbon atoms present in the substituent group, including any present in any branched groups. Additionally, when describing the number of carbon atoms in, for example fatty acids, this refers to the total number of carbon atoms including the one at the carboxylic acid, and any present in any branch groups.

Many of the chemicals which may be used in the present invention are obtained from natural sources. Such chemicals typically include a mixture of chemical species due to their natural origin, Due to the presence of such mixtures, various parameters defined herein can be an average value and may be non-integral.

The term "drilling fluid" refers to water based drilling fluids or oil based drilling fluids. Examples of suitable water based drilling fluids are given in patent WO2005/087891 and this document is incorporated herein by reference. Examples of suitable oil based drilling fluids of the inverse emulsion type are given in patent U.S. Pat. No. 4,776,966 and this document is incorporated herein by reference. Drilling fluids are used in drilling well bores to provide cooling, lubrication, pressure balance and/or drilling cuttings removal (commonly all of these) and may additionally act as a carrier for additives having particular effects e.g. shale inhibition. In common use in the art the terms "drilling fluid" and "drilling mud" are synonymous.

The term "brine" refers to an aqueous solution of one or more salts, particularly one in which the salt concentration is relatively high, in particular to provide a solution having a density substantially higher than fresh water or sea water. Preferably the brine comprises a higher concentration of salts than present in normal sea water. A saturated brine is one which, under use conditions, will not dissolve further of at least one (but, where more than one salt is used, not necessarily all) of its component salt(s) and references to percent saturation are to the relative concentration of such a salt as compared with its concentration at saturation.

The term 'functionality' as used herein with regard to a molecule or part of a molecule refers to the number of functional groups in that molecule or part of a molecule. A carboxylic acid group, a hydroxyl group and an amine group are all examples of functional groups. For example, a diacid (with two carboxylic acid groups) and a diol (with two hydroxyl groups) both have a functionality of 2 and a triacid and triol both have a functionality of 3.

The term 'residue' as used herein is the part of a reactant molecule which remains in the reaction product compound after a reaction has occurred.

The term 'dimer fatty diacid' (also referred to as dimer fatty acid or dimer acid) is well known in the art and refers to the dimerisation products of mono- or polyunsaturated fatty acids and/or esters. Due to the carboxylic acid group on each individual fatty acid (monomer), a dimer fatty diacid comprises two carboxylic acid groups. The related term 'trimer fatty triacid' similarly refers to trimerisation products of mono- or polyunsaturated fatty acids and/or esters.

The term 'dimer fatty residue' as used herein, unless otherwise defined, refers to a residue of a dimer fatty diacid or a residue of a dimer fatty diacid derivative such as a dimer fatty diol or a dimer fatty diamine.

The term 'trimer fatty residue' as used herein, unless otherwise defined, refers to a residue of a trimer fatty triacid or a residue of a trimer fatty triacid derivative such as a trimer fatty triol or a trimer fatty triamine.

Dimer fatty diacids are described in T. E. Breuer, 'Dimer Acids', in J. I. Kroschwitz (ed.), Kirk-Othmer Encyclopedia of Chemical Technology, 4th Ed., Wily, New York, 1993. Vol. 8, pp. 223-237. They are prepared by polymerising fatty acids under pressure, and then removing most of the unreacted fatty acid starting materials by distillation. The final product usually contains some small amounts of mono fatty acid and trimer fatty triacids but is mostly made up of dimer fatty diacids. The resultant product may be prepared with various proportions of these different components as desired.

Drilling Fluid

The drilling fluid may be a water-based drilling fluid or an oil-based drilling fluid, preferably a water-based drilling fluid. The drilling fluid is suitable for lubricating a drill bit during drilling in a geological formation.

The drilling fluid comprises an aqueous brine phase. The drilling fluid may comprise an oil phase. The oil phase may comprise a petroleum fraction e.g. kerosene and/or diesel. The oil phase may comprise a mineral oil and/or a vegetable oil. The drilling fluid may comprise a water-in-oil emulsion (also known as an invert emulsion).

The drilling fluid comprises a particulate solid phase. The particulate solid phase may comprise dispersed solids. The particulate solid phase may comprise weighting solids and/or bridging solids, preferably weighting solids.

The drilling fluid may be a vertical drilling fluid, a horizontal drilling fluid, a weighted drilling fluid, a drill-in fluid or a completion fluid, preferably a weighted drilling fluid or a drill-in fluid.

The drilling fluid may be a "weighted" drilling fluid. The particulate solid phase may comprise weighting solids. A weighted drilling fluid is typically used for drilling mainly vertical bore holes. The weighting solids may be relatively high density finely divided solid material used to increase the density of a drilling fluid particularly to increase the hydrostatic pressure at the bottom of a well bore.

The drilling fluid may be a "drill-in" fluid. A drill-in fluid is a fluid used when drilling through the reservoir section of a well bore e.g. from the bottom of a primary well in a reservoir to provide access to more remote parts of the reservoir. Such well bores are typically mainly horizontal. The drill-in fluid may comprise bridging solids. The bridging solids may be finely divided materials used to prevent or eliminate loss of fluid from the well bore to the formation (lost circulation). The bridging solids may be suitable and/or used to bridge across the pore throats or fractures of an exposed rock surface thereby building a filter cake to prevent loss of whole mud or excessive filtrate. The bridging solids may be solids that are able block the pores in the reservoir rock to prevent flow of oil or gas into the well bore along its length, particularly during drilling. It is desirable to be able to subsequently remove the bridging material after drilling e.g. to enable production from along a length of the well bore; with this in mind the bridging solids may comprise water soluble salts e.g. sodium chloride, used in drilling with saturated brine based drilling fluids. The bridging solids may comprise calcium carbonate, which may subsequently be removed with acid. The bridging solids may comprise oil soluble compounds such as oil soluble resins. Typically, the amount of bridging solids in a drill-in fluid is from 0.1 to 30 wt %, particularly 1 to 5 wt %, by weight of the drilling fluid.

The aqueous brine phase may comprise at least one of:
  i) dissolved calcium, particularly at a concentration of at least 0.1 molar,
  ii) dissolved formate, particularly at a concentration of at least 0.5 molar;

iii) dissolved silicate, particularly at a concentration of at least 0.4 molar; or
iv) brine salts at a concentration of at least 90% by weight of the concentration at saturation.

For drill-in fluids and methods, type i) and iv) brines are more commonly used than the ii) and iii) type brines. Preferably the drilling fluid comprises an aqueous brine phase selected from i) and iv).

The drilling fluid may have a density of at least 1.1 g/cm$^3$ i.e. a specific gravity (SG) of approximately 1.1. Preferably the drilling fluid has a density of at least 1.3 g/cm$^3$, particularly at least 1.5 g/cm$^3$. The drilling fluid may have a density of at most 3 g/cm$^3$, preferably at most 2.6 g/cm$^3$, particularly at most 2.3 g/cm$^3$.

a) Aqueous Brine Phase

The aqueous brine phase of the drilling fluid typically comprises a brine in which the salts used to form the brine are typically electrolytes. The aqueous brine phase preferably comprises at least one of:
i) dissolved calcium, preferably as Ca$^{2+}$ ions, particularly at a concentration of at least 0.1 molar,
ii) dissolved formate, preferably as a potassium or caesium salt (e.g. caesium formate), particularly at a concentration of at least 0.5 molar;
iii) dissolved silicate, preferably as alkali metal (e.g. sodium) silicate, particularly at a concentration of at least 0.4 molar; or
iv) brine salts at a concentration of at least 90% by weight of the concentration at saturation.

The aqueous brine phase may comprise dissolved calcium as Ca$^{2+}$ ions at a concentration of at least 0.5 molar, particularly at least 1 molar. The aqueous brine phase may comprise dissolved alkali metal formate, preferably caesium formate, particularly at a concentration of at least 1 molar. The aqueous brine phase may comprise dissolved alkali metal silicate, preferably sodium, ortho- or meta-silicate, particularly at a concentration of from 0.4 to 1 molar. The aqueous brine phase may comprise at least one brine salt at a concentration of at least 95% by weight of the concentration at saturation. Preferably the aqueous brine phase comprises a higher concentration of salts than present in normal sea water.

The aqueous brine phase may comprise inorganic salts, such as alkali metal salts, particularly sodium, potassium or caesium, or alkali earth metal particularly calcium or magnesium, or occasionally heavy metals such as zinc, halides, particularly chlorides or bromides; and occasionally nitrates; or water soluble, particularly alkali metal e.g. sodium or potassium, silicates or metasilicates. Sodium chloride is very commonly used, and frequently, particularly in marine environments, the drilling fluid may be based on seawater, which includes other salts as well as sodium chloride although at relatively low concentrations. Other salts, particularly salts of organic acids such as formic acid, may be used, for example sodium, potassium and caesium formates. The brine will often include a mixture of salts as mixtures may enable higher concentration and thus aqueous phase densities to be achieved. Most of these brines are naturally relatively near to neutral, though alkali metal earth halides will tend to be moderately acidic and alkali metal, particularly sodium or potassium, formates tend to be moderately alkaline. Silicate brines are unusual among brines in that the brine is naturally relatively alkaline, generally having a pH >10, more usually about 12. Indeed, a major utility of silicate brines is that then can react to precipitate silica or insoluble silicate in pores or cracks in the well bore wall, e.g. in shale so they inherently act as shale inhibitors.

Generally; the concentration of salt(s) in the brine will depending on the density desired for the brine, Typically, the brine salt concentration will be from 0.1 to 30% w/w, particularly 0.1 to 10% w/w, by weight of the drilling fluid. For particular salts, concentrations in the brines will usually be within the ranges given in Table 1 below.

TABLE 1

| Brine Salt | Broad concentration | | Preferred concentration | | Notes |
| --- | --- | --- | --- | --- | --- |
| | By weight (% w/w) | Molar (M) | By weight (% w/w) | Molar | |
| sodium chloride | 1 to 35 | 0.2 to 6 | 2 to 6 | 0.4 to 6 | up to saturation ca 6.1M |
| calcium chloride | 1 to 20 | 0.1 to 6.5 | 0.1 to 20 | 0.5 to 6.5 | up to saturation ca 6.5M |
| potassium chloride | 0.1 to 30 | 0.1 to 4 | 0.1 to 10 | 0.1 to 1.5 | up to saturation ca 4.7M |
| caesium formate | 9 to 82(*) | 0.5 to 11 | 17 to 82 | 1 to 11 | up to saturation |
| potassium formate | 4 to 45 | 0.5 to 9 | 8 to 40 | 1 to 8 | up to saturation ca 9M |
| sodium silicate | 0.5 to 40 | 0.4 to 2 | 2 to 20 | 0.5 to 1 | |

(*)caesium formate is typically supplied as an 82 wt % solution b) Particulate Solid Phase The drilling fluid comprises a particulate solid phase. The particulate solid phase may be dispersed solids. The particulate solid phase may comprise weighting solids and/or bridging solids, preferably weighting solids.

The particulate solid phase may be insoluble in the drilling fluid continuous phase e.g. aqueous brine phase and/or oil phase. The particulate solid phase may, comprise at least one water insoluble mineral. The particulate solid phase may be used to add weight to the drilling fluid e.g. the particulate solid phase may have a density substantially higher than seawater. The specific gravity (SG) of the particulate solid phase may be at least 2, preferably at least 2.5, more preferably at least 3, particularly preferably at least 4. In this context SG is approximately numerically the same as density measured in g/cm$^{-3}$. The SG of the particulate solid phase may be at most 8.

The particulate solid phase may comprise barium, preferably a barium containing mineral, particularly a barite, especially $BaSO_4$. The barium containing mineral may have a specific gravity (SG) of at least 4. The particulate solid phase may comprise iron oxide, particularly haematite, preferably with an SG of at least 5. The particulate solid phase may comprise galena (PbS), preferably with an SG of at least 7. The particulate solid phase may comprise ferrous carbonate, particularly sideiite, preferably with an SG of at least 3. The particulate solid phase may comprise mixed iron oxide and titanium dioxide, particularly ilmenite, preferably with an SG of at least 4.

The drilling fluid may comprise the particulate solid phase in an amount of from 1 to 75 wt %, preferably 2 to 65 wt %, particularly 5 to 55 wt %, by weight of the drilling fluid. The drilling fluid may comprise at least 1 wt % of particulate solid phase, preferably at least 2 wt %, more preferably at least 5 wt %, particularly at least 10 wt %, by weight of the drilling fluid. The drilling fluid may comprise at most 80 wt % of particulate solid phase, preferably at most 60 wt %, more preferably at most 40 wt %, by weight of the drilling fluid.

c) Compound of the Invention

The compound c) is a compound comprising a dimer and/or trimer fatty residue and an alkyleneoxy chain comprising a first ethyleneoxy section, a second ethyleneoxy section, and a propyleneoxy section located between the first ethyleneoxy section and the second ethyleneoxy section, wherein the propyleneoxy section comprises from 1 to 20 propyleneoxy groups. Compound c) may be used to lubricate a drill bit, preferably during drilling in a geological formation. Compound c) may act as, preferably is, a drilling lubricant.

The drilling fluid may comprise at least 0.1 wt % of compound c), preferably at least 0.5 wt %, more preferably at least 1 wt %, particularly at least 2 wt %, by weight of the drilling fluid. The drilling fluid may comprise at most 15 wt % of compound c), preferably at most 10 wt %, more preferably at most 5 wt %, by weight of the drilling fluid. The amount of compound c) that is included in the drilling fluid is preferably from 0.5 to 10 wt %, particularly from 1 to 5 wt %, by weight of the drilling fluid.

The weight ratio of dimer fatty residues to trimer fatty residues in the compound c) can be varied, by modifying the processing conditions and/or the unsaturated fatty acid feedstock.

In the compound, the weight ratio of di-functional material (e.g. dimer fatty residue) to tri-functional material (e.g. trimer fatty residue) may be from 20:1 to 02:1, preferably from 5:1 to 0.2:1, more preferably from 4:1 to 0.5:1. For example, the compound may comprise a mixture of dimer fatty diacid residues and trimer fatty triacid residues. The weight ratio of dimer fatty diacid to trimer fatty triacid may be from 20:1 to 0.2:1, preferably from 5:1 to 0.2:1, more preferably from 4:1 to 0.5:1.

The dimer fatty diacids or dimer fatty residues used in the invention are preferably derived from the dimerisation products of C10 to C30 fatty acids, more preferably C12 to C24 fatty acids, particularly 01.4 to C22 fatty acids, further preferably C16 to C20 fatty acids, and especially C18 fatty acids. Thus, the resulting dimer fatty diacids may comprise in the range from 20 to 60, preferably 24 to 48, particularly 28 to 44, further preferably 32 to 40, and especially 36 carbon atoms.

The fatty acids, from which the dimer fatty diacids are derived, may be selected from linear or branched unsaturated fatty acids. The unsaturated fatty acids may be selected from fatty acids having either a cis/trans configuration, and may have one or more than one unsaturated double bond. Preferably, the fatty acids used are linear monounsaturated fatty acids.

Suitable dimer fatty diacids are preferably derived from (i.e. are the dimer equivalents of) the dimerisation products of oleic acid, linoleic acid, linolenic acid, palmitoleic acid, or elaidic acid. In particular, suitable dimer fatty diacids are derived from oleic acid. The dimer fatty diacid may not be derived from a feedstock in which linoleic or linolenic acid are the component with the highest wt % in the feedstock.

The dimer fatty diacids may be dimerisation products of unsaturated fatty acid mixtures obtained from the hydrolysis of natural fats and oils, e.g. sunflower oil, soybean oil, olive oil, rapeseed oil, cottonseed oil, or tall oil. The dimer fatty diacids may be derived from a feedstock in which rapeseed (rape) oil or soybean (soya) oil is the component with the highest wt % in the feedstock.

The molecular weight (weight average) of the dimer fatty diacid may be in the range from 450 to 690, more preferably 500 to 640, particularly 530 to 610, and especially 550 to 590.

In addition to the dimer fatty diacids, dimerisation usually results in varying amounts of trimer fatty triacids (so-called "trimer"), oligomeric fatty acids, and residues of monomeric fatty acids (so-called. "monomer"), or esters thereof, being present. The amount of monomer can, for example, be reduced by distillation.

Similarly, the trimer fatty triacids are preferably derived from the trimerisation products of the materials mentioned with regard to the dimer fatty acids, and are preferably trimers of C10 to C30, more preferably C12 to C24, particularly C14 to C22, further preferably C16 to C20 fatty acids, and especially C18 fatty acids. Thus, the trimer fatty triacids may contain in the range from 30 to 90, more preferably 36 to 72, particularly 42 to 66, further preferably 48 to 60, and especially 54 carbon atoms.

The molecular weight (weight average) of the trimer fatty triacids may be in the range from 750 to 950, more preferably 790 to 910, particularly 810 to 890, and especially 830 to 870.

The dimer fatty acid may comprise less than 10 wt %, more preferably less than 6 wt %, particularly preferably less than 4 wt % of mono fatty monoacid (or monomer).

All of the above weight percentage (wt %) values are based on the total weight of polymerised fatty acids and mono fatty acids present.

The dimer fatty residues may be hydrogenated. The dimer fatty residues may be non-hydrogenated. Preferably the dimer fatty residues and/or trimer fatty residues are non-hydrogenated.

The dimer fatty residue may comprise a dimer fatty acid residue, dimer fatty diol residue or dimer fatty diamine residue, preferably a dimer fatty acid residue or dimer fatty diol residue more preferably a dimer fatty acid residue. The trimer fatty residue may comprise a trimer fatty acid residue, trimer fatty triol residue or trimer fatty triamine residue, preferably a trimer fatty acid residue or trimer fatty triol residue more preferably a trimer fatty acid residue.

The compound c) has a first ethyleneoxy section, which is designated by $(EO)_p$ in formula (I). The value of p is from 1 to 20, meaning there are from 1 to 20 ethyleneoxy groups (or ethylene oxide equivalents) in the first ethyleneoxy section. Preferably p is at least 2, more preferably at least 3, yet more preferably at least 4, especially preferably at least 5. Preferably p is at most 18, more preferably at most 15, yet more preferably at most 12, especially preferably at most 10. Preferably, p is from 3 to 15.

The compound c) has a propyleneoxy section which is designated by $(PO)_q$ in formula (I). The value of q is from 1 to 20, meaning there are from 1 to 20 propyleneoxy groups (or propylene oxide equivalents) in the propyleneoxy section. Preferably q is at least 2, more preferably at least 3, yet more preferably at least 4, especially preferably at least 5. Preferably q is at most 18, more preferably at most 15, yet more preferably at most 12, especially preferably at most 10. Preferably, q is from 3 to 15.

The amount of propyleneoxy groups in the compound may affect the pour point of the compound. A higher number of propyleneoxy groups may reduce the pour point, which may be desirable if the drilling fluid is to be used in a cold environment. Having the value of q from 3 to 15 may provide a suitable number of propylene oxide equivalents to advantageously reduce the pour point of the compound.

The compound c) has a second ethyleneoxy section which is designated by $(EO)_r$ in formula (I). The value of r is from 1 to 20, meaning there are from 1 to 20 ethyleneoxy groups (or ethylene oxide equivalents) in the second ethyleneoxy section. Preferably r is at least 2, more preferably at least 3, yet more preferably at least 4, especially preferably at least 5. Preferably r is at most 18, more preferably at most 15, yet more preferably at most 12, especially preferably at most 10. Preferably, r is from 3 to 15.

The ethyleneoxy sections and propyleneoxy sections may contain minor proportions of other alkyleneoxy groups. For example, the propyleneoxy section may include minor proportions of butyleneoxy groups. The minor proportion of such other alkyleneoxy units may not be more than 10 mol % and is preferably not more than 5 mol % of the total alkyleneoxy groups in the respective section.

The molecular weight (number average and weight average) of compound c) may be determined by gel permeation chromatography as described herein. Suitable GPC apparatus and settings are given in Example 5.

The compound c) may have a molecular weight (number average) of at least 500 preferably at least 800 Da, more preferably at least 1000 Da, even more preferably at least 1500 Da. The compound c) may have a molecular weight (number average) of at most 20,000 Da, preferably at most 10,000 Da, more preferably at most 5000 Da, even more preferably at most 4000 Da.

The compound c) may have a molecular weight (weight average) of at least 500 Da, preferably at least 1000 Da, more preferably at least 1500 Da, even more preferably at least 2000 Da, especially preferably at least 2500 Da. The compound c) may have a molecular weight (weight average) of at most 20,000 Da, preferably at most 15,000 Da, more preferably at most 10,000 Da, even more preferably at most 8000 Da.

The viscosity of the compound c) may be measured at 25° C. on a Brookfield viscometer using a 29 Spindle at a shear rate of 0.25 N. The viscosity may be expressed in centipoise (cP). The viscosity of compound c) at 25° C. may be at least 500 cP, preferably at least 1000 cP. The viscosity of compound c) at 25° C. may be at most 15,000 cP, preferably at most 12,000 cP, more preferably at most 10,000 cP, even more preferably at most 8,000 cP. Preferably the compound c) has a viscosity at 25° C. of 500 cP to 15,000 cP.

A viscosity of at most 10,000 cP at 25° C. may be advantageous for compound c) because it may allow the compound to be directly added to drilling fluid without the need for specialist pumping equipment.

The pour point of the compound c) may be measured on an ISL MPP 5Gs automated pour point analyser according to the ASTM 097 standard method. The pour point of the compound c) may be at least −45° C., preferably at least −40° C. The pour point of the compound c) may be at most +50° C., preferably at most 30° C., more preferably at most 20° C., even more preferably at most 15° C., yet more preferably at most 10° C. A lower pour point may be advantageous if the drilling fluid is to be used in a cold temperature environment. The compound c) may be a liquid at room temperature.

The compound c) may be a compound of the general formula (I), also referred to as compound (I):

$$R^1[(EO)_p(PO)_q(EO)_r]_n R^2 \qquad (I)$$

where:
$R^1$ is a residue of at least one of: a dimer fatty diacid, a trimer fatty triacid, a dimer fatty diol and/or a trimer fatty triol;
$R^2$ is H or $(CO)_x R^3$ where x is 0 or 1 and $R^3$ is a $C_1$ to $C_6$ aliphatic hydrocarbyl group;
EO is an ethyleneoxy group;
PO is a propyleneoxy group,
p is from 1 to 20;
q is from 1 to 20;
r is from 1 to 20; and
n is from 1 to 3.

Compound (I) comprises at least one ethyleneoxy group, EO ($—C_2H_4O—$). An ethyleneoxy group may also be referred to herein as an ethylene oxide equivalent. Compound (1) comprises at least one propyleneoxy group, PO ($—C_3H_6O—$), A propyleneoxy group may also be referred to herein as a propylene oxide equivalent. An alkyleneoxy group may be referred to herein as an alkylene oxide equivalent.

Where the number of ethyleneoxy groups and propyleneoxy groups is given in terms of per molecule, preferably this is the average number of groups per molecule in a sample of the product. Individual molecules in the sample may have fewer or greater than the stated number of groups, but on average the sample will comprise molecules having an average of the stated number of groups.

The value of n in compound (I) indicates the average number of alkyleneoxy chains in compound (I) and is from 1 to 3. A dimer residue may have up to two alkyleneoxy chains attached to it and a trimer residue may have up to 3 alkyleneoxy chains attached to it. The value of n is preferably at least 1.2, more preferably at least 1.5, yet more preferably at least 1.8, especially preferably at least 2, particularly preferably at least 2.2. The value of n may be at most 2.9, preferably at most 2.8. Preferably n is from 1.2 to 3.

The number of ethyleneoxy groups in an alkyleneoxy chain may be given by (p+r). The value of (p+r) may be from 2 to 40, preferably from 4 to 36, more preferably from 6 to 30.

The total number of alkyleneoxy groups in an alkyleneoxy chain may be given by p+q+r. The value of p+q+r is at least 3 and may be at least 6, preferably at least 9. The value of p+q+r is at most 60 and may be at most 51, preferably at most 45.

The ratio of individual ethyleneoxy groups to propyleneoxy groups in an alkyleneoxy chain may be given by the ratio of (p+r) to q. The ratio of (p+r) to q may be from 0.5 to 8:1, preferably from 0.5 to 6:1, more preferably from 1 to 4:1 particularly preferably from 1.5 to 2.5:1. These ratios of ethyleneoxy to propyleneoxy groups may provide a suitable balance between the hydrophilic ethyleneoxy groups and the less hydrophilic propyleneoxy groups.

The relative length of the first ethyleneoxy segment to the propyleneoxy segment to the second ethyleneoxy segment may be given by the ratio of p to q to r. The ratio of p to q to r may be from 0.5 to 2:from 0.5 to 2:from 0.5 to 2, preferably from 0.75 to 1.5:from 0.75 to 1.5:from 0.75 to 1.5 more preferably from 0.8 to 1.2:0.8 to 1.2:0.8 to 1.2.

The weight ratio of $R^1$ to total alkyleneoxy (ethyleneoxy and propyleneoxy) groups in compound (I) may be at least 0.1:1, preferably at least 0.2:1. The weight ratio of $R^1$ to alkyleneoxy (ethyleneoxy and propyleneoxy) groups in compound (I) may be at most 1:1, preferably at most 0.8:1, more preferably at most 0.6:1. Compound (I) may comprise an optional end cap as shown in the definition of $R^2$ as H or $(CO)_xR^3$ where x is 0 or 1 and $R^3$ is a $C_1$ to $C_6$ aliphatic hydrocarbyl group. The optional end cap may be ether linked (where x is 0) or ester linked (where x is 1). $R^3$ may be a $C_1$ to $C_6$ aliphatic hydrocarbyl group, preferably a $C_1$ to $C_6$ alkyl group, more preferably a $C_1$ to $C_3$ alkyl group. Most preferably there is no end cap i.e. $R^2$ is H.

d) Optional Additives

The drilling fluid comprises d) optionally, one or more additives selected from rheology modifiers, fluid loss control agents, shale inhibitors, gas hydrate inhibitors and dispersants.

The drilling fluid may comprise a dispersant. The dispersant may comprise lignite and/or lignosulphonate. Dispersants may be included to aid dispersion of solid components of or solids held in the drilling fluid. Solid components of the drilling fluid include weighting solids cuttings. When used, dispersants are typically included at levels of 0.1 to 5 wt % by weight of the drilling fluid.

The drilling fluid may comprise a fluid loss control agent. The fluid loss control agent may comprise a polysaccharide, preferably cellulose, particularly modified cellulose e.g. esterified or esterified cellulose, or a clay e.g. bentonite. Fluid loss control agents act to reduce the tendency of the drilling fluid to penetrate rocks through which the well is being drilled thus losing drilling fluid and potentially damaging the rock e.g. by potentially blocking a production zone. When used, fluid loss control agents are typically included at levels of 0.1 to 10 wt % based on the drilling fluid.

The drilling fluid may comprise a shale inhibitor. The shale inhibitor may comprise an alcohol alkoxylate, preferably C3 to C6 alcohol ethoxylate, propoxylate or mixed ethoxylate/propoxylate e.g. butanol mixed ethoxylate/propoxylates. The shale inhibitor may comprise an ethylene oxide/propylene oxide block copolymer. When used, shale inhibitors are typically included at levels of 0.1 to 10 wt % based on the drilling fluid.

The drilling fluid may comprise a rheology modifier. The rheology modifier may comprise a polysaccharide, preferably xanthan gum, starch or cellulose, or a clay, preferably bentonite. When used, rheology modifiers are typically included at levels of 0.1 to 1.0 wt % by weight of the drilling fluid. Rheology modifiers can be classed as viscosifiers, thinners or thermally stable rheology modifiers. The drilling fluid may comprise a viscosifier, thinner or thermally stable rheology modifier.

The drilling fluid may comprise a gas hydrate inhibitor. The gas hydrate inhibitor may be a thermodynamic inhibitor (melting point depressant), preferably a glycol such as monoethylene glycol or diethylene glycol, used at levels of from 1 to 20 wt % by weight of the drilling fluid; or a kinetic inhibitor (crystallisation inhibitor or crystal growth inhibitor), preferably a polyvinyl pyrolidone, or quaternary ammonium salt, typically used at levels of from 0.1 to 10, more usually 0.2 to 10 wt % by weight of the drilling fluid.

A preferable composition of the drilling fluid is summarised in Table 2 below.

TABLE 2

| | Amount in the drilling fluid (% w/w) |
|---|---|
| Aqueous brine phase | |
| brine salts | 0.1 to 30 |
| water | to 100% |
| Particulate solids | |
| weighting material (when present) | 1 to 75 |
| bridging material (when present) | 1 to 30 |
| Drilling lubricant | |
| Compound c) of the Invention | 0.1 to 10 |
| Optional additives (when present) | |
| dispersants | 0.1 to 5 |
| fluid loss control agents | 0.1 to 10 |
| shale inhibitors | 0.1 to 10 |
| rheology modifiers | 0.1 to 1.0 |
| thermodynamic gas hydrate inhibitors | 1 to 20 |
| kinetic gas hydrate inhibitors | 0.1 to 10 |

In use in drilling well bores, the drilling fluid may well be alkali, often having a pH above 9, commonly above 10 and sometimes above 11.

In use, re-circulated drilling fluids will tend to accumulate more finely divided part of the drilling cuttings—the coarser materials will generally be removed e.g. by screening before re-circulation. In this sense, drilling cuttings may be regarded as a component of drilling fluids and will typically be present at levels of up to 20 wt %, more usually up to 10 wt %, by weight of the drilling fluid.

Method

The invention also provides a method of drilling a well bore comprising the steps of circulating a drilling fluid according to the invention through a drill string extending through the well bore and around a drill bit.

The method may comprise drilling a well bore downwards, preferably substantially vertically, towards a target, particularly a production, formation. The method may comprise circulating a weighted drilling fluid down a drill string extending down a well bore, around a drill bit and upwardly in the space between the drill string and the wall of the well bore.

The method may comprise drilling-in a well bore in a production formation, preferably substantially horizontally. The method may comprise circulating a drill-in fluid through a drill string extending along the well bore, around a drill bit and returns in the space between the drill string and the wall of the well bore.

The well or well bore may be in a geological formation. The geological formation may be a rock formation. The geological formation may be a water and/or hydrocarbon (e.g. oil and/or gas), preferably hydrocarbon bearing formation. The geological formation may be a production formation i.e. a formation from which natural resources (e.g. hydrocarbons and/or water, preferably hydrocarbons) may be produced.

Use

The invention also provides the use in a drilling fluid of a compound to lubricate a drill bit wherein the compound comprises a dimer and/or trimer fatty residue and an alkyleneoxy chain comprising a first ethyleneoxy section, a second ethyleneoxy section, and a propyleneoxy section located between the first ethyleneoxy section and the second ethyleneoxy section, wherein the propyleneoxy, section comprises from 1 to 20 propyleneoxy groups.

The compound may be a compound c) as described herein, preferably the compound is a compound of the formula (I) as described herein.

Any or all of the features described herein, and/or any or all of the steps of any method or process described herein, may be used in any combination in any aspect of the invention.

EXAMPLES

The present invention is illustrated by the following non-limiting Examples. All parts and percentages are given by weight unless otherwise stated.

It will be understood that all tests and physical properties have been determined at atmospheric pressure and room temperature (i.e. about 20° C.), unless otherwise stated herein, or unless otherwise stated in the referenced test methods and procedures.

Reactants

Reactants used in the following examples are identified as follows:
   dimer fatty diacid—non-hydrogenated $C_{36}$ dimer fatty dicarboxylic acid including at least 70 wt % dimer diacid—ex Croda.
   trimer fatty triacid—non-hydrogenated C54 trimer fatty tricarboxylic acid including at least 50 wt % trimer triacid—ex Croda.

Test Methods a) Lubricity Meter Performance was measured at 25° C. using a Fann Extreme Pressure & Lubricity Meter (Model 212 available from the Fann Instrument Company). 3 vol. % of the sample compound in the specified brine was added to the lubricity meter which was then set running at 60 rpm for 5 minutes with no torque applied. A torque of 150 lbs/inch at 60 rpm was applied for a further 5 minutes before the coefficient of friction was recorded.

b) Brine Compatibility was measured by adding 3 vol % of the sample compound to a glass sample jar. The specified brine solution was then added to the jar and the lid replaced. The jar was shaken by hand for 30 seconds. Digital photographs of the jar were taken immediately after shaking and observations were made about the compatibility of the lubricant/brine mixture based on the photographs. A transparent mixture indicated the sample was soluble. An opaque but stable mixture indicated the sample was dispersible but not soluble.

c) Viscosity was measured at 25° C. on a Brookfield viscometer using a 29 Spindle at a shear rate of 0.25 N.

d) Pour Point was measured on an ISL MPP 5Gs automated pour point analyser according to the ASTM D97 standard method.

e) Number average molecular weight and Weight average molecular weight were determined by Gel Permeation Chromatography (GPC). The apparatus and settings used for the GPC are given in Table 6 below.

f) Hydroxyl Value is defined as the number of mg of potassium hydroxide equivalent to the hydroxyl content of 1 g of sample and was measured by acetylation followed by hydrolysation of excess acetic anhydride. The acetic acid formed was subsequently titrated with an ethanolic potassium hydroxide solution.

g) Acid Value is defined as the number of mg of potassium hydroxide required to neutralise the free fatty acids in 1 g of sample and was measured by direct titration with a standard potassium hydroxide solution.

Example 1

Compound 1 (C1) was prepared in a two-step process:
   a. an alkyleneoxy chain of the ABA sequence 5EO-5PO-5EO was formed; and
   b. the alkyleneoxy chain was reacted with dimer fatty diacid as specified in Reactants above.

a. Formation of 5EO-5PO-5EO Alkyleneoxy Chain 7000 g of di(propylene glycol), 100 g potassium hydroxide and 110 g water were charged to an alkoxylation reactor, with nitrogen sparge and vacuum capability. The reaction vessel was then heated to 125° C. and vacuum of 0.2 mbar applied. 9200 g propylene oxide was charged and reacted for 1 hour. The pressure was then increased to 2 bar and vessel heated gently to 150° C. and 22500 g ethylene oxide was charged and stirred for two hours. The reaction was continued until a hydroxyl value in the range of 140.0-160.0 mg KOH $g^{-1}$ was achieved. The vessel was cooled to 80° C. and 50 g lactic acid to neutralise the potassium hydroxide was charged and stirred for 1 hour. The product was a 5EO-5PO-5EO alkyleneoxy chain.

b. Formation of Compound 1

1200 g of the dimer fatty diacid (see Reactants), 2892 g of the 5EO-5PO-5EO alkyleneoxy chain from step a and 4.1 g of para toluene sulphonic acid (p-TSA) were charged to a flask, fitted with stirrer, side-arm distillation, thermocouple, nitrogen sparge and thermostatic electric mantle. The reaction mixture was then heated gently with stilling to 220° C. and water distilled off. The reaction was continued until the acid value was less than 5.0 mg KOH $g^{-1}$. The product, referred to herein as Compound 1 (C1), was then cooled and discharged.

Example 2

Compounds 2 to 5 (C2 to C5) were prepared according to the two-step process of Example 1, with suitable adaptions to the quantities and ingredients used. The reactants used to produce C2 to C5 are given in Table 3:

TABLE 3

| Compound | Dimer/Trimer reactant | Quantity (g) | Alkyleneoxy reactant | Quantity (g) | Catalyst | Quantity (g) |
|---|---|---|---|---|---|---|
| C2 | Dimer fatty diacid | 900 | 7EO-7PO-7EO | 3184 | p-TSA | 4.1 |
| C3 | Trimer fatty triacid | 1200 | 5EO-5PO-5EO | 2897 | p-TSA | 4.1 |
| C4 | Trimer fatty triacid | 900 | 7EO-7PO-7EO | 3190 | p-TSA | 4.1 |
| C5 | Trimer fatty triacid | 800 | 9EO-9PO-9EO | 3206 | p-TSA | 4.0 |

Example 3

Compound 6 (C6) was prepared using a direct alkoxylation process as follows. 1000 g of trimer fatty triacid as specified in Reactants, S g potassium hydroxide and 9 g water were charged to an alkoxylation reactor, with nitrogen sparge and vacuum capability. The reaction vessel was then heated to 125° C. and vacuum of 0.2 mbar applied. 740 g ethylene oxide was charged, the pressure increased to 2.4 bar and heated gently to 150° C. for 2 hours. The pressure was then dropped to 0.2 bar and temperature to 1.25° C. 958 g propylene oxide was charged and stirred for two hours. Finally, 740 g of ethylene oxide was then charged, the vessel heated gently to 150° C. and pressure increased to 2.4 bar for two hours. The reaction was continued until a hydroxyl value of less than 70 mg KOH $g^{-1}$ was obtained. The resulting product will be referred to herein as Compound 6. Compounds 7 and 8 were prepared according to the direct alkoxylation process described above for Compound 6, with suitable adaptions to the quantities of ingredients used. The composition of Compounds 6 to 8 is given in Table 4:

TABLE 4

| Compound | Dimer/Trimer | Alkyleneoxy Chain |
| --- | --- | --- |
| C6 | Trimer fatty triacid | 5EO-5PO-5EO |
| C7 | Trimer fatty triacid | 7EO-7PO-7EO |
| C8 | Trimer fatty triacid | 9EO-9PO-9EO |

Example 4

Various physical properties of Compounds 1 to 8 were tested according to the Test Methods described above. The results are given in Table 5:

TABLE 5

| Compound | Physical form at room temperature | Viscosity at 25° C. (cP) | Pour Point (° C.) |
| --- | --- | --- | --- |
| C1 | Liquid | 2400 | −21 |
| C2 | Liquid | 6700 | 0 |
| C3 | Liquid | 4600 | −27 |
| C4 | Liquid | 3200 | −18 |
| C5 | Liquid | 3600 | 0 |
| C6 | Liquid | 1800 | −30 |
| C7 | Liquid | 1400 | −30 |
| C8 | Liquid | 3900 | −30 |

Example 5

The molecular weights of Compounds 1 to 8 were analysed using Gel Permeation Chromatography (GPC). The apparatus and settings used for the GPC are given in Table 6:

TABLE 6

| | |
| --- | --- |
| Spectrometer | Polymer labs GPC-50 |
| Detector | Refractive index |
| Columns | PL gel 3 μm 100A & PL gel 5 μm mixed D |
| Solvent | Tetrahydrofuran (GPC grade). |
| Concentration of test substance | 1% |
| Colum temperature | 40° C. |
| Flow rate | 1 ml per minute |
| Injection Volume | 20 micro litre |
| Analysis time | 25 minutes |
| Method Type | Area Normalisation |

The results of the GPC analysis were that all of compounds C1 to C8 had a molecular weight (by number average) in the range from 1500 Da to 3500 Da and a molecular weight (by weight average) in the range from 3000 Da to 6000 Da.

Example 6

Analytical properties of Compounds 1 to 8 were determined with results given in Table 7:

TABLE 7

| Compound | Acid Value (mgKOH/g) | Water Content (wt %) |
| --- | --- | --- |
| C1 | 4.9 | 0.1 |
| C2 | 4.8 | 0.2 |
| C3 | 4.4 | 0.1 |
| C4 | 4.4 | 0.1 |
| C5 | 3.7 | 0.1 |
| C6 | 1.8 | 0.1 |
| C7 | 1.7 | 0.1 |
| C8 | 1.7 | 0.1 |

Example 7

The performance of Compound C2 as an additive for a drilling fluid was evaluated by testing its city Meter Performance (see Table 8) and Brine Compatibility (see Table 9) in two different brine solutions in accordance with the Test Methods described above. The thine Compatibility of a commercially available water-based drilling lubricant, Radiagreen EME ex Oleon, was also tested as a comparison.

The two different brine solutions chosen for this study were (a) 5 wt iii potassium chloride (KCl) brine and (b) 38 wt % calcium chloride (CaCl2) brine. When preparing the potassium chloride brine, the desired amount of salt was weighed into a beaker, deionised water added, and the mixture stirred on a stirrer hotplate at room temperature using a magnetic stirrer flea for 30 minutes, or until all of the salt had dissolved. The dissolution of calcium chloride into water is exothermic and so in this case the desired amount of deionised water was weighed into a beaker, which was then stirred using a magnetic stirrer flea and a stirrer hotplate at room temperature. The CaCl2) salt was weighed into a separate beaker and added to the water slowly, so as not to cause to rapid a rise in temperature.°

TABLE 8

| | Blank Coefficient of friction (brine only) | Coefficient of friction with C2 added (3 vol. % of C2 in brine) | % Reduction in coefficient of friction C2 versus blank |
| --- | --- | --- | --- |
| 5 wt % KCl brine | 35 | 13 | 63 |
| 38 wt % CaCl2 brine | 15 | 4 | 73 |

It can be seen from Table 8 that compound C2 is an effective drilling lubricant in both brines.

TABLE 9

| | Brine Compatibility of 3 vol. % C2 in Brine | Brine Compatibility of 3 vol. % Radiagreen EME in Brine |
| --- | --- | --- |
| 5 wt % KCl brine | soluble | dispersible |
| 38 wt % CaCl2 brine | soluble | dispersible |

It can be seen from Table 9 that compound C2 is more brine compatible than Radiagreen EME.

It is to be understood that the invention is not to be limited to the details of the above embodiments, which are described by way of example only. Many variations are possible.

The invention claimed is:

1. A drilling fluid comprising:
   a) an aqueous brine phase;
   b) a particulate solid phase;
   c) a compound comprising a dimer and/or trimer fatty residue and an alkyleneoxy chain comprising a first ethyleneoxy section, a second ethyleneoxy section, and a propyleneoxy section located between the first ethyleneoxy section and the second ethyleneoxy section, wherein the propyleneoxy section comprises from 1 to 20 propyleneoxy groups; and
   d) optionally, one or more additives selected from rheology modifiers, fluid loss control agents, shale inhibitors, gas hydrate inhibitors and dispersants;
   wherein the drilling fluid is suitable for lubricating a drill bit during drilling in a geological formation, and
   wherein the compound c) is a compound of the formula (I):

wherein:
   $R^1$ is a residue of at least one of: a dimer fatty diacid, a trimer fatty triacid, a dimer fatty diol and/or a trimer fatty triol;
   $R^2$ is H or $(CO)_x R^3$ where x is 0 or 1 and $R^3$ is a $C_1$ to $C_6$ aliphatic hydrocarbyl group;
   EO is an ethyleneoxy group;
   PO is a propyleneoxy group;
   P is from 1 to 20;
   q is from 1 to 20;
   r is from 1 to 20;
   n is from 1 to 3;
   a weight ratio of $R^1$ to total ethyleneoxy and propyleneoxy groups in compound c) is 0.2:1 to 0.6:1; and
   wherein the ratio of (p+r) to q is from 0.5 to 8:1.

2. The drilling fluid according to claim 1 wherein the particulate solid phase comprises barium.

3. The drilling fluid according to claim 1 comprising the particulate solid phase in an amount of from 1 to 75 wt %, by weight of the drilling fluid.

4. The drilling fluid according to claim 1 wherein the drilling fluid has a density of at least 1.1 g/cm³.

5. The drilling fluid according to claim 1 wherein the aqueous brine phase comprises at least one of:
   i) dissolved calcium at a concentration of at least 0.1 molar,
   ii) dissolved formate at a concentration of at least 0.5 molar;
   iii) dissolved silicate at a concentration of at least 0.4 molar; or
   iv) brine salts at a concentration of at least 90% by weight of the concentration at saturation.

6. The drilling fluid according to claim 1 wherein the aqueous brine phase comprises dissolved calcium as $Ca^{2+}$ ions at a concentration of at least 0.5 molar.

7. The drilling fluid according to claim 1 wherein the aqueous brine phase comprises dissolved alkali metal formate.

8. The drilling fluid according to claim 1 wherein the aqueous brine phase comprises dissolved alkali metal silicate.

9. The drilling fluid according to claim 1 wherein the aqueous brine phase comprises at least one brine salt at a concentration of at least 95% by weight of the concentration at saturation.

10. The drilling fluid according to claim 1 further comprising an oil phase.

11. The drilling fluid according to claim 1 wherein p is from 3 to 15.

12. The drilling fluid according to claim 1 wherein q is from 3 to 15.

13. The drilling fluid according to claim 1 wherein r is from 3 to 15.

14. The drilling fluid according to claim 1 wherein $R^2$ is H.

15. The drilling fluid according to claim 1 wherein n is from 1.2 to 3.

16. The drilling fluid according claim 1 wherein the compound c) acts as a drilling lubricant.

17. A method of drilling a well bore comprising the steps of circulating a drilling fluid through a drill string extending through the well bore and around a drill bit, wherein the drilling fluid is the drilling fluid according to claim 1.

18. A method comprising lubricating a drill bit with a drilling fluid comprising:
   a) an aqueous brine phase;
   b) a particulate solid phase;
   c) a compound comprising a dimer and/or trimer fatty residue and an alkyleneoxy chain comprising a first ethyleneoxy section, a second ethyleneoxy section, and a propyleneoxy section located between the first ethyleneoxy section and the second ethyleneoxy section, wherein the propyleneoxy section comprises from 1 to 20 propyleneoxy groups; and
   d) optionally, one or more additives selected from rheology modifiers, fluid loss control agents, shale inhibitors, gas hydrate inhibitors and dispersants;
   wherein the drilling fluid is suitable for lubricating a drill bit during drilling in a geological formation, and
   wherein the compound c) is a compound of the formula (I):

wherein:
   $R^1$ is a residue of at least one of: a dimer fatty diacid, a trimer fatty triacid, a dimer fatty diol and/or a trimer fatty triol;
   $R^2$ is H or $(CO)_x R^3$ where x is 0 or 1 and $R^3$ is a $C_1$ to $C_6$ aliphatic hydrocarbyl group;
   EO is an ethyleneoxy group;
   PO is a propyleneoxy group;
   p is from 1 to 20;
   q is from 1 to 20;
   r is from 1 to 20;
   n is from 1 to 3;
   a weight ratio of $R^1$ to total ethyleneoxy and propyleneoxy groups in compound c) is 0.2:1 to 0.6:1; and
   wherein the ratio of (p+r) to q is from 0.5 to 8:1.

* * * * *